E. N. LUBURG.
SLACK ADJUSTER.
APPLICATION FILED MAR. 11, 1912.

1,166,465.

Patented Jan. 4, 1916.
2 SHEETS—SHEET 1.

E. N. LUBURG.
SLACK ADJUSTER.
APPLICATION FILED MAR. 11, 1912.
1,166,465.
Patented Jan. 4, 1916.
2 SHEETS—SHEET 2.
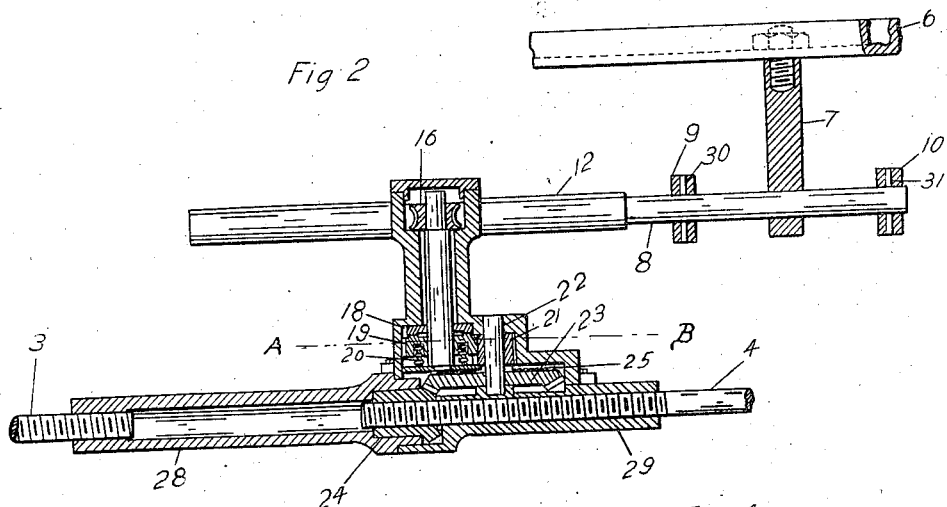
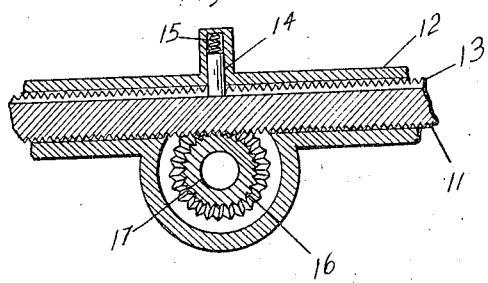
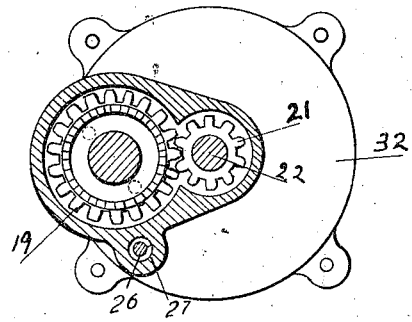

UNITED STATES PATENT OFFICE.

ELLSWORTH NELSON LUBURG, OF BALTIMORE, MARYLAND.

SLACK-ADJUSTER.

1,166,465.  Specification of Letters Patent.  Patented Jan. 4, 1916.

Application filed March 11, 1912. Serial No. 682,910.

*To all whom it may concern:*

Be it known that I, ELLSWORTH NELSON LUBURG, a citizen of the United States, residing in Baltimore city and State of Maryland, have invented a new and useful Slack-Adjuster, of which the following is a specification.

My invention relates to improvements in slack adjusters especially in connection with the braking and equalizing mechanism of automobiles; and the object of my improvement is the providing of automatic means of taking up the slack to maintain a fixed amount of movement between the fully open position and the position when the brake is applied.

A further object of my invention is to provide means for preventing false adjustments, such as might occur from the temporary jamming of the brake parts in false position due to dirt or foreign substances and which would temporarily prevent the real and proper application of the brake.

A further object of my invention is the providing of a definite means of holding or maintaining the brake-rod at a required length and outside means of varying said positive means operated by said brake-rod.

A further object of my invention is the providing of means of equalizing strain on both sides of the vehicle.

A further object of my invention is the providing of adjustable means of regulating the length of the brake-rod by means of stops on an independent rod operating mechanism adjusting the brake-rod.

A further object of my invention is the providing of a machine of extreme simplicity and ease of adjustment and capable of high speed in accomplishing the above desired results.

With the foregoing and other objects in view, my invention consists of the novel construction, combination and arrangement of parts as hereinafter specifically described and illustrated in the accompanying drawings, wherein is shown the preferred embodiment of the invention, but it is to be understood that changes, variations and modifications can be resorted to which come within the scope of the claims hereunto appended.

Figure 1:
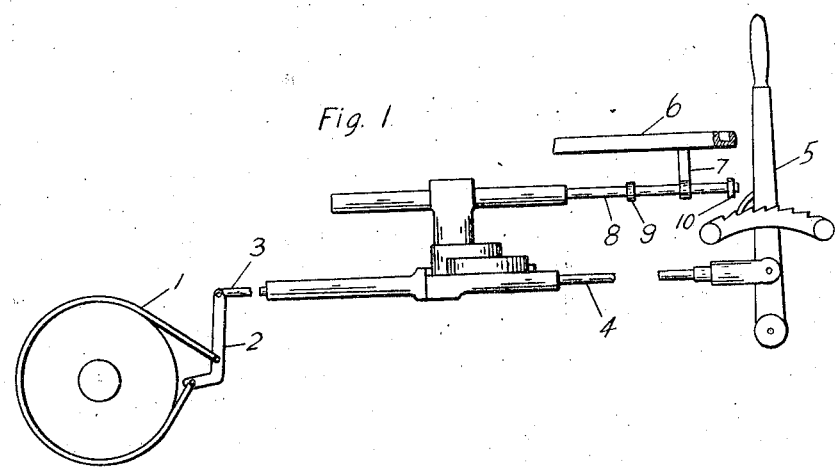
Figure 5:
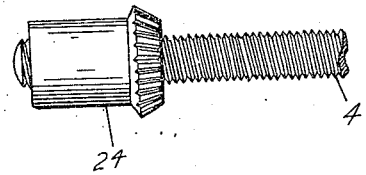
Figure 6:
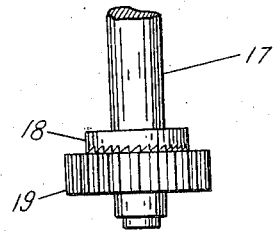

In the drawings, Figure 1, shows a view of my improved slack adjuster applied to an automobile brake. Fig. 2, shows an enlarged view of my slack adjuster partly in section. Fig. 3 is a view in section of the operative rack and pinion, taken at right angles to that part shown in Fig. 2. Fig. 4 is a view of the gear and pinion with the casing shown in section taken on line "AB" of Fig. 2. Fig. 5 is an enlarged view of the brake-rod screw and holding nut, and Fig. 6 is an enlarged view of the operative shaft showing its ratchet and gear.

Similar numerals refer to similar parts throughout the several views.

1 is a brake band.
2 is the brake lever.
3 and 4 the brake-rod.
5 is the brake handle.
6 is a part of the fixed frame of the automobile in which is secured guide 7 through which operates operative rack-rod 8 on which are secured stops 9 and 10.

On the end of operative rack-rod 8 is secured operative rack 11 inside of casing 12, said rack as illustrated having a slot 13 longitudinally thereof in which operates pin 14 maintained in position by spring 15 and operating to prevent rack 11 from becoming circularly displaced.

Rack 11 drives a spiral pinion 16 which pinion is secured to operative shaft 17. On operative shaft 17 is secured ratchet wheel 18 which ratchet wheel 18 engages in teeth on gear 19 which gear is mounted loosely on shaft 17 and is maintained in mesh with ratchet wheel 18 by means of springs 20 operating in pockets in gear 19.

Gear 19 drives pinion 21 which pinion 21 is secured to shaft 22, and on which shaft 22 is secured bevel gear 23, which bevel gear drives bevel pinion nut 24.

On the rear of the bevel gear 23 are ratchet teeth 25 which are engaged by pin 26, which pin 26 is held in place by spring 27.

The brake rod end 3 is secured in the casing 28 and the brake rod end 4 is free to move in the casing although it has its threaded end engaging the threads of the beveled pinion nut 24. The casing parts 28 and 29 are secured together in any suitable manner and are secured to the gear casing 32 although no specific means are illustrated. As a means for securing the stops 9 and 10 in any desired position of adjustment upon the rack rod 8, suitable means, such as pins 30, 31 are employed.

The operation of the described embodiment of my invention is as follows: My slack adjuster being installed in the pull rod between the handle and equalizer or at any other convenient place, or if to be used as an equalizer, then one in each of the brake-rods. The brake is used in the ordinary way. The stops 9 and 10 being adjusted on operative rack-rod 8 to allow the desired movement of handle 5 from a wide open position to that of the brakes being fully applied. If from any cause the brake or brake bands become worn and lever 2 must be pulled farther down than at first, stop 9 brings up against guide 7 thereby arresting operative rack-rod 8 thus causing rack pinion 16 to revolve ratchet wheel 18 the same slipping over the ratchet teeth on gear 19, the gear giving away or sliding longitudinally on its shaft by means of spring 20 yielding. Upon releasing handle 5 and bringing the brake-rods back to initial position or wide open before that position is reached, stop 10 engages with guide 7 thus holding operative rack-rod 8, thereby turning rack pinion 16 operating shaft 17, ratchet wheel 18, gear 19 by means of engaging the teeth thereon, pinion 21, pinion shaft 22, bevel gear 23, and bevel pinion nut 24 screwing the same on to end 4 of the brake-rods or pull rod thus shortening the same until the handle goes back to initial position.

It will be obvious from the above that the stops 9 and 10 are presumed to be set to give a free movement of the entire mechanism which will permit movement of the operating lever 5 from the full open position of the brake band to the full closed position thereof. When the brake is fully applied, the stop 9 will just rest against the fixed stop 7 and in the event of any wear occurring on the brake parts, a further movement of the brake lever 5 and consequent movement of the entire mechanism will force the rack bar 8 rearwardly. Upon a release movement of the brake rod 3, 4, the stop 10 will engage the fixed abutment 7 before the lever 5 is fully returned and as the mechanism, as a whole, moves rearwardly with the movement of the lever 5, the rack bar 8 will impart rotary movement to the gear train and take up or shorten the rod 3, 4 to an amount exactly equal to the excess movement of the lever 5, that is, such movement of the lever 5 as occurs after the brake is set. It is also apparent that no adjustment of the parts will be effected unless the stop 9 comes into engagement with the fixed abutment 7. Therefore, if the brake-band 1 is jammed, due to foreign substances between it and the brake drum, there will be no adjustment of the rod 3 and 4. The whole adjustment of the length of the rod 3 and 4 is dependent upon the movement imparted to the rack bar 8 when an excess movement is given to the mechanism through the lever 5 having moved a greater distance than that normally required for full application of the brake.

In a co-pending application, Serial No. 752,414, filed March 6th, 1913, I have shown and claimed a device which will preclude any possibility of a false adjustment due to vibration or other causes and in said application have shown clutch devices which lock the adjusting member and prevent any possibility of false adjustments. These devices are claimed in said co-pending application.

Having thus described my invention what I claim and desire to secure by Letters Patent is:

1. In a slack adjuster, a brake rod, a rotative member having a screw-threaded engagement therewith, means for rotating said member during the release movements of the brake rod with reference to the brake, said means including an adjusting bar moving with said brake rod during the normal braking movements of the brake rod and stationary with reference to the brake rod during abnormal movements thereof.

2. In a slack adjuster, a sectional brake rod, a casing uniting the ends thereof, a rotary member engaging one section of the brake rod and held against longitudinal movement with reference to the casing, an actuating rack bar, a gear train intermediate said rack bar and rotary member, clutch devices permitting a free movement of said gear train relatively to the rotary member during a movement of the sectional brake rod in one direction and imparting movement of said gear train to said rotary member during a movement of the brake rod in the opposite direction, a fixed abutment and adjustable stops adapted to engage said abutment and determine the movement of the rack bar.

3. In a slack adjuster, a sectional brake rod, a casing joining the adjacent ends of said rod, a rotary member having a thread engagement with one section of the brake rod, said rotary member held against longitudinal movement with reference to the casing, a rack bar moving with said casing and brake rod and adapted to be held against movement during certain movements of the brake bar and casing, a gear train connecting said rack bar and rotary member, a fixed abutment engaging the rack bar and adjustable stops adapted to engage said abutment and determine the movement of the rack bar.

4. In a slack adjuster, a sectional brake rod, rotary means intermediate the adjacent ends of said rod for adjusting one section relatively to the other, means for rotating said member, said means including a gear train and rack bar, a fixed abutment and stops for adjusting the position of the rack bar with reference to the movements of the brake rod and clutch devices intermediate the rack bar and rotary member for imparting the movements of the rack bar to the rotary member during certain movements of the brake rod and permitting free movement of the rack bar during certain other movements of the brake rod.

5. In a slack adjuster, a rack bar having limited longitudinal movement, a pinion meshing with said rack bar, a fixed abutment and stops for determining the movement of the rack bar and pinion, a brake rod, a rotary member operating to adjust said rod, connections intermediate said rotary member and rack pinion, permitting relative movement thereof during a relative difference of movement of the rack bar and brake rod and imparting movement to the rotary member during certain other relative movements of the rack bar and brake rod.

6. In a brake adjuster, a rotative member operating to adjust a rod, a rack bar moving with said rod, a gear train intermediate said rack bar and the rotary member, means for preventing movement of said rotary member in one direction, an abutment appurtenant to the rack bar, adjustable stops arranged upon the rack bar and determining the movement thereof as they engage the abutment, said stops permitting movement of the rack bar equal to the normal braking movements of the brake rod and holding said rack bar during abnormal movements of the brake rod whereby adjustments of the rod are effected only upon abnormal movements thereof.

7. In a slack adjuster, a casing in which a brake rod is secured and operated, means for drawing said brake rod into the casing, said means including a reciprocating member adapted to move with said brake rod during the normal adjusted movements of said rod and adapted to be locked against movement during the excess movement of the brake rod and means for transmitting movement from said member to the brake rod during movement of the latter.

8. In a slack adjuster, a casing in which a brake rod is secured and operated, means for drawing said brake rod into the casing, said means including a reciprocating member adapted to move with said brake rod during the normal adjusted movements of said rod, a relatively fixed stop through which said reciprocating member passes, adjustable stops upon said member on opposite sides of said relatively fixed stop, said stops adapted to lock the reciprocating member against movement during the excess movement of the brake rod and means for transmitting movement from said reciprocating member to the brake rod during movement of the latter.

9. In a slack adjusted, means for taking up the brake rod to an extent equal to that traversed by the brake rod past its normal regulated movement for braking consisting of a mechanism having a fixed movement with the brake rod and positive stop devices for preventing its movement during the excess movement of the brake rod, thereby transmitting through the excess movement motion and effecting an adjustment for taking up the brake rod as it is moved.

ELLSWORTH NELSON LUBURG.

Witnesses:
 DAN'L F. REISENWEBER,
 ALBERT H. SMITH.